United States Patent
Beda, III et al.

(10) Patent No.: US 9,535,742 B1
(45) Date of Patent: *Jan. 3, 2017

(54) CLUSTERING FOR PARALLEL PROCESSING

(71) Applicant: Google Inc., Mountain View, CA (US)

(72) Inventors: Joseph S. Beda, III, Seattle, WA (US); Grzegorz J. Czajkowski, Redwood City, CA (US); Yonggang Zhao, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/148,661

(22) Filed: May 6, 2016

Related U.S. Application Data (63) Continuation of application No. 13/727,943, filed on Dec. 27, 2012, now Pat. No. 9,336,024.

(51) Int. Cl.
*G06F 9/455* (2006.01)

(52) U.S. Cl.
CPC ... *G06F 9/45558* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | |
|---|---|---|
| 7,590,620 B1 | 9/2009 | Pike et al. |
| 7,650,331 B1 | 1/2010 | Dean et al. |
| 7,756,919 B1 | 7/2010 | Dean et al. |
| 8,126,909 B2 | 2/2012 | Pike et al. |
| 8,612,510 B2 | 12/2013 | Dean et al. |
| 2006/0271395 A1* | 11/2006 | Harris ............... G06F 9/52 718/1 |
| 2012/0254193 A1 | 10/2012 | Chattopadhyay et al. |
| 2012/0278323 A1 | 11/2012 | Chattopadhyay et al. |
| 2013/0007854 A1* | 1/2013 | Sorenson, III ...... H04L 63/0823 726/5 |
| 2013/0226891 A1* | 8/2013 | Markus ............ G06F 17/30356 707/703 |
| 2013/0227558 A1* | 8/2013 | Du ..................... G06F 9/45558 718/1 |

* cited by examiner

*Primary Examiner* — H S Sough
*Assistant Examiner* — Carina Yun
(74) *Attorney, Agent, or Firm* — Fish & Richardson P.C.

(57) ABSTRACT

Methods, systems, and apparatus, including computer programs encoded on computer storage media, for clustering for parallel processing. One of the methods includes providing virtual machines with an interface to a shuffle service, the shuffle service executing external of the virtual machines. The method includes receiving data records through the interface, each data record having a key and a value. The method includes partitioning the data records, using the shuffle service, according to the respective keys. The method includes providing a part of the partitioned data records through the interface to the virtual machines, wherein data records having the same key are provided to the same virtual machine. Each of the virtual machines can execute on a host machine and each of the virtual machine is a hardware virtualization of a machine.

18 Claims, 5 Drawing Sheets

CLUSTERING FOR PARALLEL PROCESSING

CROSS-REFERENCE TO RELATED APPLICATION

This application is a continuation of U.S. patent application Ser. No. 13/727,943, filed Dec. 27, 2012 and issuing as U.S. Pat. No. 9,336,024 on May 10, 2016 entitled "CLUSTERING FOR PARALLEL PROCESSING", which is incorporated in its entirety herein by reference.

BACKGROUND

This specification relates to parallel processing.

Cloud computing refers to network-based computing in which collections of servers housed in data centers or "server farms" provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on a server farm simplifies management of end user computing devices. Some cloud computing services allow end users to execute software applications in virtual machines. In a public cloud computing environment, multiple users are able to launch virtual machines (VMs), and each VM launched by a user is included in a cluster of other VMs launched by the user.

MapReduce is a framework for processing highly distributable problems across huge datasets using a large number of computers. Processing in map reduce frameworks consists of a series of steps including map, shuffle, and reduce.

SUMMARY

In general, one innovative aspect of the subject matter described in this specification can be embodied in methods that include the actions of providing virtual machines with an interface to a shuffle service, the shuffle service executing external of the virtual machines. The method includes the actions of receiving data records through the interface, each data record having a key and a value. The method includes the actions of partitioning the data records, using the shuffle service, according to the respective keys. The method includes the actions of providing a part of the partitioned data records through the interface to the virtual machines, wherein data records having the same key are provided to the same virtual machine. Each of the virtual machines can execute on a host machine and each of the virtual machine is a hardware virtualization of a machine.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The interface for a virtual machine may be integrated with a file system component of the hardware virtualization. Receiving data records may occur in response to write operations to the file system. Providing the partitioned data may include writing the data records to the file system. The file system may include a data storage device shared across host machines. Providing a part of the partitioned data records may include receiving a request from one of the virtual machines to receive data records with a particular key. Receiving data records may include receiving data records from the virtual machines over a network. Providing the part of the partitioned data records through the interface may include transmitting each part of the partitioned data records to the respective virtual machine over the network. Shuffle service may execute on a machine that is separate from the host machines Particular embodiments of the subject matter described in this specification can be implemented so as to realize one or more of the following advantages. Performance can be improved. A large group of system resources (e.g., computers, processors, memory, etc.) can be shared among multiple clients of a virtual machine environment. Partitioning data records can occur more efficiently for virtual machine systems. The implementation of a shuffle service can be changed without altering the underlying software code.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A cloud computing environment can be used to execute parallel processing systems on virtual machines. For example, a group of virtual machines may execute a map reduce application framework. The hardware associated with the cloud computing environment is centrally controlled and optimized services, such as a shuffle service, can be provided to the virtual machines by the cloud computing environment.

Figure 1:
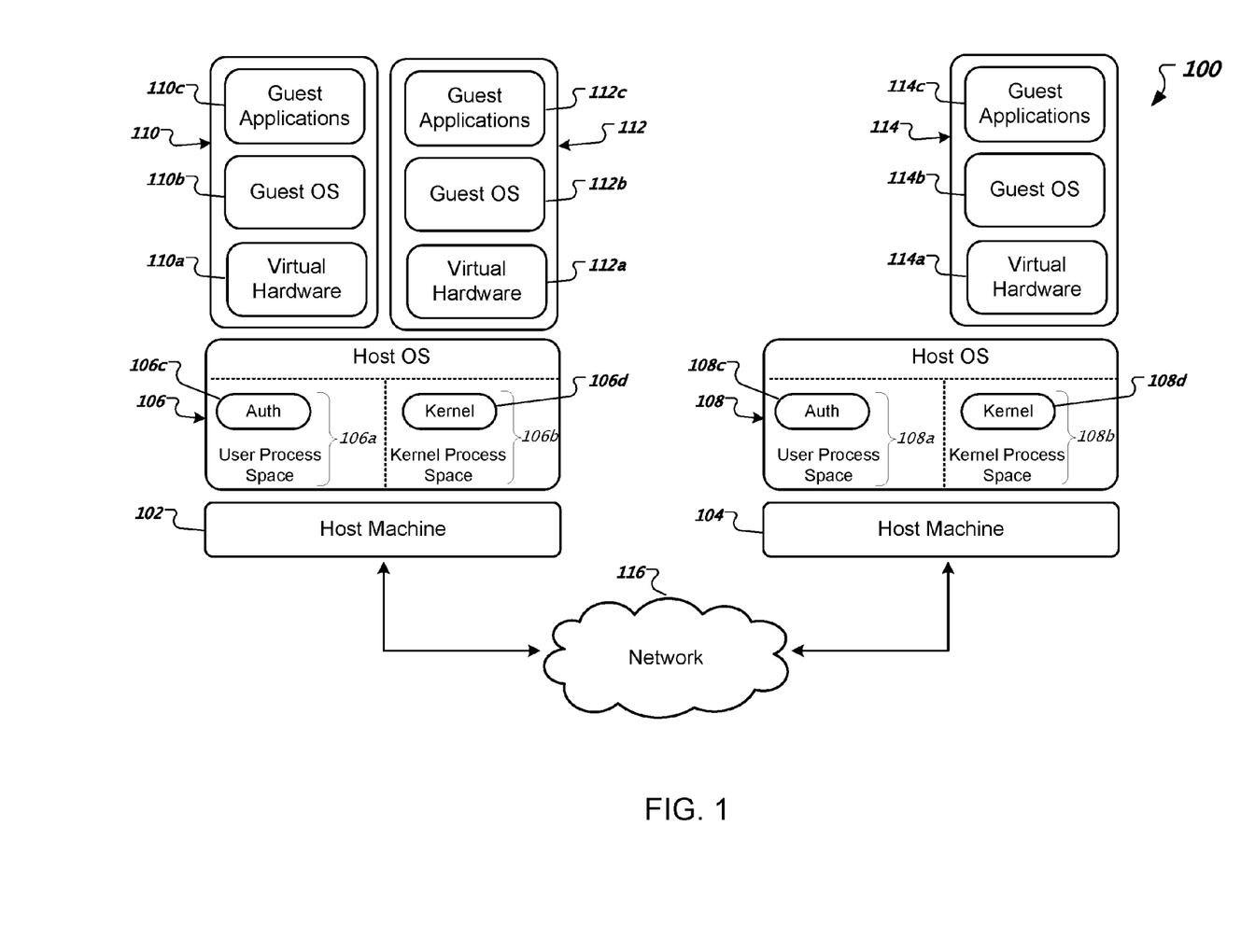
FIG. 1 shows an example of a distributed system that runs multiple virtual machine instances over a geographically distributed virtual network.

FIG. 1 shows an example of a distributed system that runs multiple virtual machine instances over a virtual network. Host machines 102, 104 included in a distributed system 100 can contain one or more data processing apparatuses such as rack mounted servers or other computing devices. Host machines 102, 104 can have different capabilities and computer architectures. Host machines 102, 104 can communicate with each other through a network 116 (e.g., dedicated or leased optical fiber or copper wires).

Each host machine 102, 104 executes a host operating system 106, 108. A host operating system 106, 108 manages host machine resources. In this example, host operating systems 106, 108 run software that virtualizes the underlying host machine hardware and manages concurrent execution of one or more VMs. For example, the host operating system 106 manages two VMs (VM 110 and VM 112), while a different host operating system 108 manages a single VM 114. A host machine can, in general, manage larger quantities of virtual machines, however, the quantity may be limited based on physical resources of the host machine.

The VMs 110, 112, 114 use a simulated version of an underlying host machine hardware, which can be referred to as virtual hardware (e.g., virtual hardware 110a, 112a and 114a). Software that is executed by the virtual hardware can be referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112 and 114) is allocated a set of virtual memory pages from the virtual memory of the underlying host operating system and is allocated virtual disk blocks from one or more virtual disk drives for use by the guest software executing on the VM. For example, host operating system 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persistent across VM restarts. In some implementations, virtual disk blocks are allocated on physical disk drives coupled to host machines. VMs can be allocated network addresses through which their respective processes can communicate with other processes via a virtual network. For example, guest software executing on VM 110 can communicate with guest software executing on VM 112 or VM 114 via the virtual network using the allocated network addresses.

A VM's guest software can include a guest operating system (e.g., guest operating systems 110b, 112b and 114b) which is software that controls the execution of respective guest software applications (e.g., guest applications 110c, 112c and 114c), within the VM and provides services to those applications. For example, a guest operating system can be an operating system such as a variant of the UNIX operating system. Other operating systems are possible. Each VM can execute the same guest operating system or different guest operating systems. Booting a VM can include using a virtual boot disk to load a kernel image associated with a guest operating system into memory. A guest operating system's access to resources such as networks and virtual disk storage can be controlled by the underlying host operating system. The VM may be associated with a virtual block device on which the guest operating system may be installed.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers. The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

Figure 2:
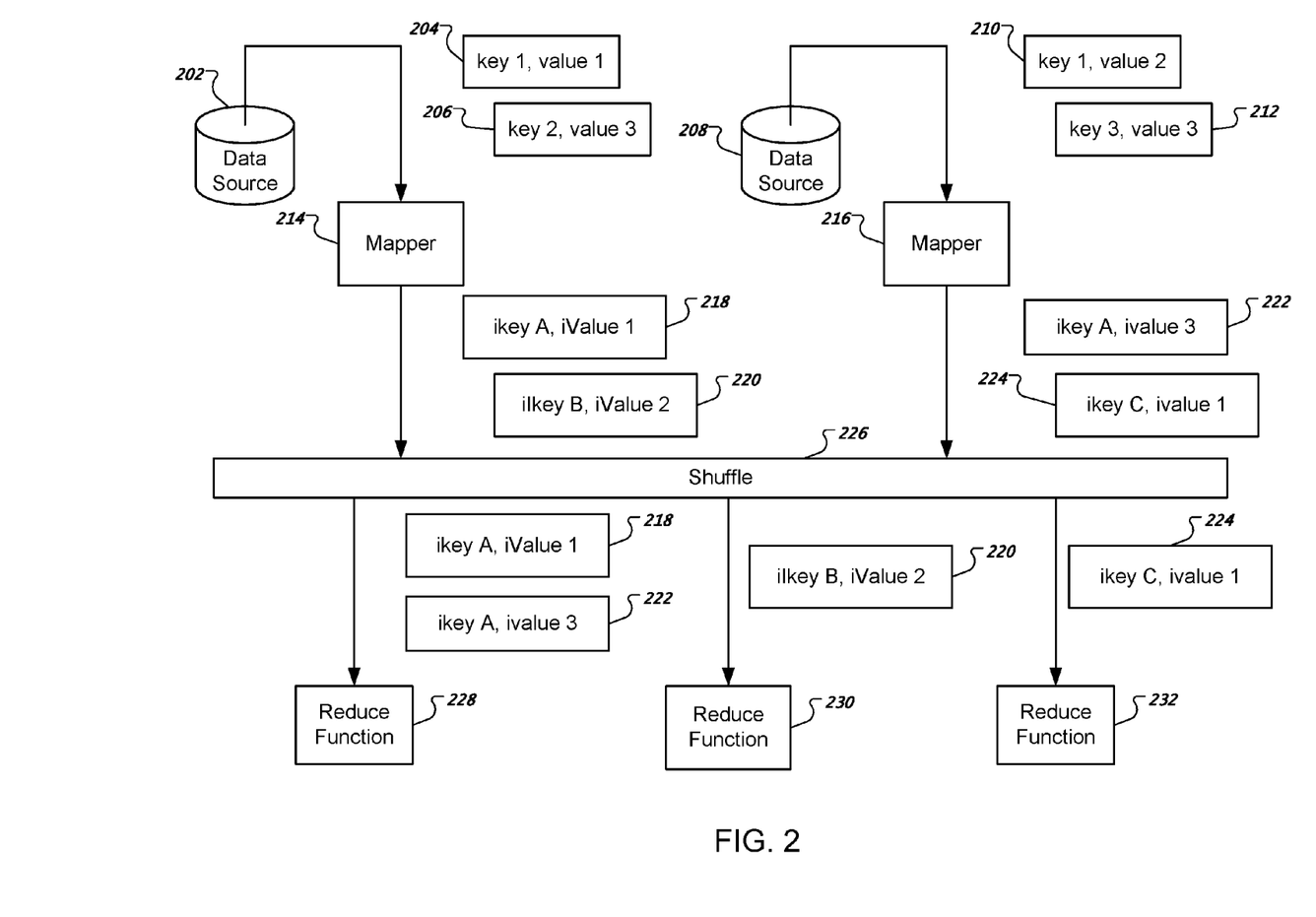
FIG. 2 shows an example of a map reduce parallel processing system.

FIG. 2 shows an example of a map reduce parallel processing system. Generally, map reduce is a parallel processing methodology. Data elements 204, 206, 210, 212 are stored in one or more data sources 202, 208. Each data source may be, for example, a relational database, a file in a file system, or an in memory data structure. Each of the data elements includes a key and a value. For example, the data element 204 includes "key 1" and "value 1." The data elements are processed by mapper components 214, 216. In some implementations, each mapper component can be associated with a separate virtual machine, for example, the virtual machines 110, 112, 114 of FIG. 1. In other implementations, one or more mapper components can be associated with a virtual machine. Each mapper component can be associated with one or more data sources. In some implementations, multiple mapper components can access the same data source.

The mapper components 214, 216 apply a mapping function to the data elements 204, 206, 210, 212 and generate intermediate data elements 218, 220, 222, 224. Mapper components generate an intermediate data element for each input data element. Examples of mapping functions include, for example, mathematic operations performed on the data elements.

Each intermediate data element 218, 220, 222, 224 includes an intermediate key. For example, intermediate data element 218 includes the intermediate key "ikey A", intermediate data element 220 includes the intermediate key "ikey B", intermediate data element 222 includes the intermediate key "ikey A", intermediate data element 224 includes the intermediate key "iKey C".

The shuffle component 226 accepts the intermediate data elements as input and partitions them based on an intermediate key. For example, intermediate data elements 218 and 222 are grouped together while intermediate data element 220 and intermediate data element 224 are separate.

The partitioned intermediate data elements are processed by reducer components (for example, reducer component 228, 230, 232). Each reducer component applies a reduce function to the partitioned intermediate data elements. Each reduce function produces one or more outputs (not shown) which can then be provided as input into the reducer components as part of a second iteration.

Figure 3:
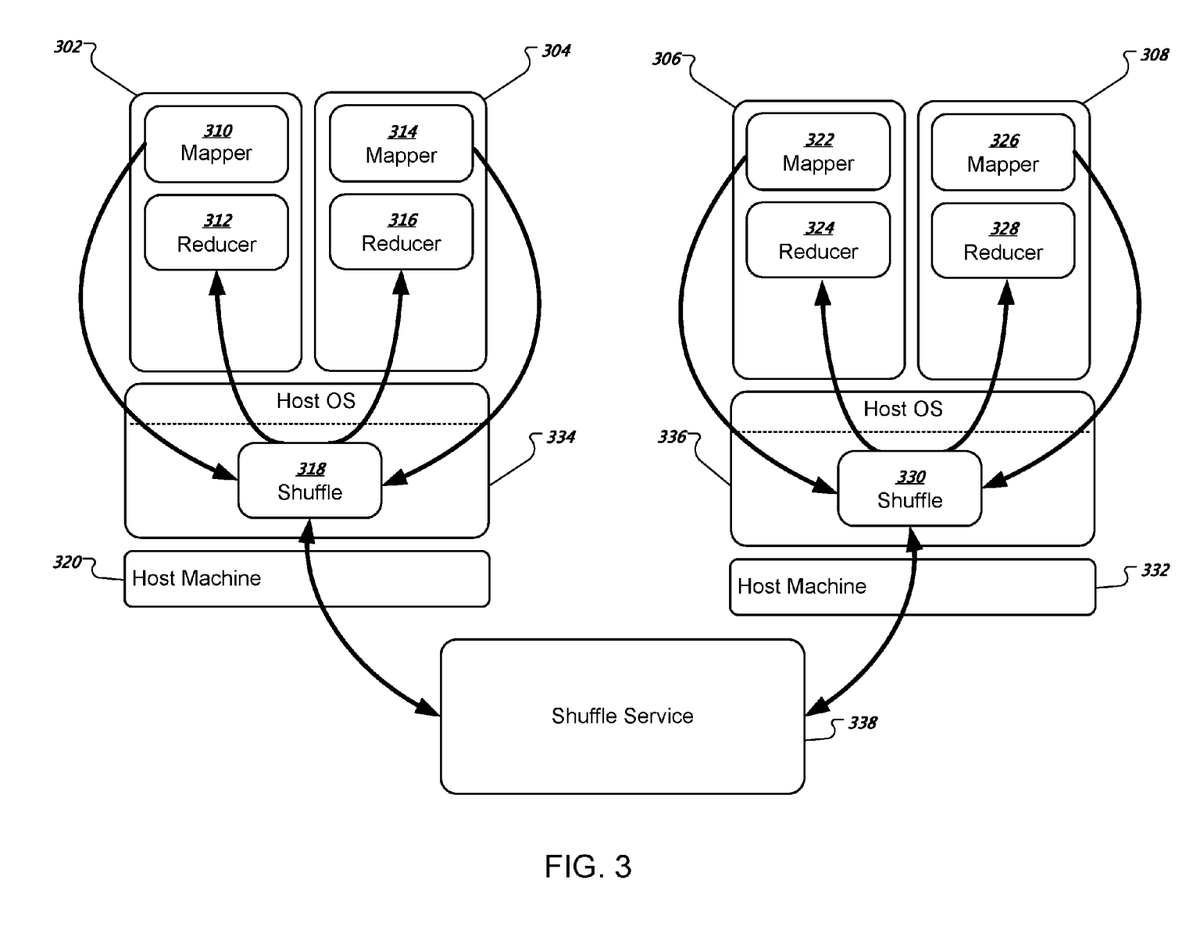
FIG. 3 shows an example of high bandwidth distributed shuffle service for an infrastructure cloud environment.

FIG. 3 shows high bandwidth distributed shuffle service for an infrastructure cloud environment. A host machine 320 includes a host operating system 334 and controls to virtual machines 302, 304. The virtual machine 302 includes a mapper component 310 and a reducer component 312. The virtual machine 304 includes a mapper component 314 and a reducer component 316. The host operating system 334 includes a shuffle interface 318 that provides access to a shuffle service 338 to the virtual machines 302 and 304.

Similarly, a host machine 332 includes a host operating system 336 and hosts virtual machines 306, 309. The virtual machine 306 includes a mapper component 322 and a reducer component 324. The virtual machine 308 includes a mapper component 326 and a reducer component function 328. The host operating system 336 includes a shuffle interface 330 that provides access to a shuffle service 338 to the virtual machines 306 and 308. The shuffle service 338 can be executed outside of the virtual environment.

The host operating systems 334 and 336 can provide shuffle services to the virtual machine hosted on the respective host machine by, for example, providing an HTTP interface to the virtual machine or integrating the shuffle service into the virtual file system of the virtual machine.

While each host machine is shown as including both a mapper component and a reducer component, a host machine is not required to include both components. For example, a host machine may execute either a mapper component, a reducer component, or both. The implementation of the shuffle service 338 can be altered without modifying the application programming interface provided to the virtual machines 302, 304, 306, 308. For example, a shuffle service designed to emphasize security over performance can be implemented with the same interface as a shuffle service designed to emphasize performance over security. The implementation of the shuffle service can be changed without affecting the mapper components or reducer component functions executing on the virtual machines.

For example, one implementation of a shuffle service may write all intermediate data to disk and then load from disk while doing the shuffle. Another implementation of a shuffle service may buffer data in random access memory (RAM) accessed over the network and thereby reduce or eliminate the need to write intermediate data to disk. In some implementations, the number of storage devices that are used, the type of those (flash/ssd, spinning disk, RAM) and the location of that storage may vary depending on the underlying cluster and the type of map reduce being run. The shuffle service can be implemented with shared hardware independent of the virtual host machines. For example, the shuffle service may include multiple servers which are shared between different multiple clients of the virtual machine environment.

Figure 4A:
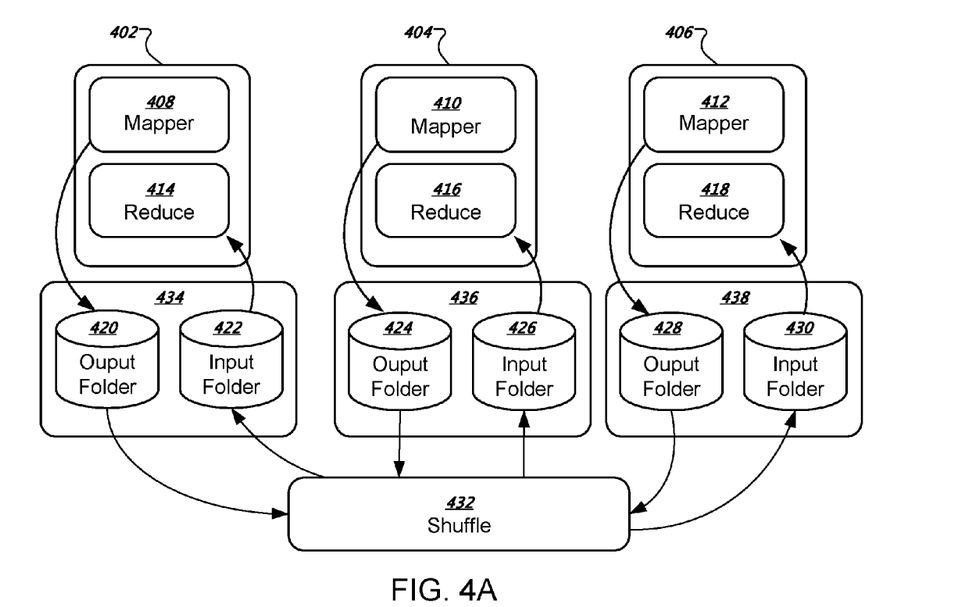
FIG. 4A illustrates an example of a shuffle service integrated with the file system of the virtual machine.

FIG. 4A illustrates an example of a shuffle service accessed via a virtual file system. A mapper component on a virtual machine writes records to an output folder (or directory) using a virtual file system of the virtual machine's operating system. For example, mapper component 408 in a virtual machine 402 writes records to the output folder 420 of the virtual operating system 434. Mapper component 410 in a virtual machine 404 writes records to the output folder 424 of the virtual operating system 436. Mapper component 412 in a virtual machine 406 writes records to the output folder 428 of the virtual operating system 438.

A shuffle service 432 reads records from the output folders 420, 424, and 428. The shuffle service 432 partitions the records based on a key. The shuffle service writes the portioned record to the input folders 422, 426, and 430. For example, each input folder may receive the records of one or more partitions.

In some implementations, the shuffle service may be a multi-tiered application. For example, a component of the shuffle service may be present on each host machine (not shown). In some implementations, the shuffle service can be implemented using dedicated hardware that is otherwise isolated from the user's virtual machine environment. Isolating the shuffle service from the user's virtual machine environment can enhance security because the user does not have direct access to the service. Because no user code executes in the shuffle service environment, the shuffle service may not have to spend processing power protecting the system against malicious or poorly optimized user code.

The reduce function 414 reads the partitioned records from the input folder 422. The reduce function 416 reads and processes the partitioned records from the input folder 426. The reduce function 418 reads and processes the partitioned records from the input folder 430.

Figure 4B:
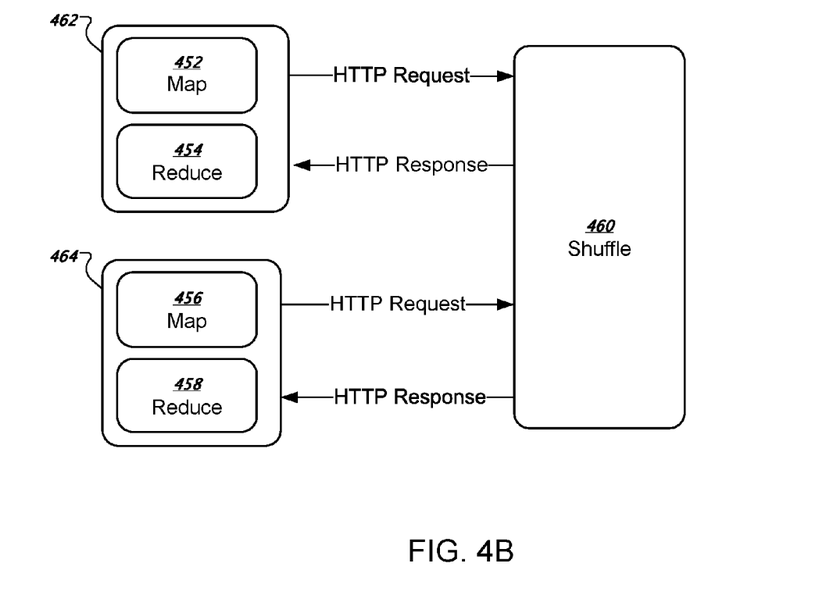
FIG. 4B illustrates an example of a shuffle service that exposes an HTTP interface.

FIG. 4B illustrates an example of a shuffle service that exposes a network interface. In some implementations, the virtual machines 462, 464 can send requests to the shuffle service when the mapper has finished processing a data record. In some implementations, the mapper component 452 can send an request for each data record that is processed by the mapper component 452. The request can include an indication as to whether the mapper has further data records the process. If the mapper has further data records to process then the shuffle service sends an immediate response. If, on the other hand, the mapper does not have any more data records to process then the request waits for an response from the shuffle service which includes the shuffle data records for use with the reducer component 454, 458.

The virtual machines 462, 464 may communicate with the shuffle service using various communication techniques, including, for example, remote procedure calls (RPC), Java Remote Message Invocations, CORBA messages, COM+, Simple Object Access Protocol (SOAP), Hyper Text Transport Protocol messages (HTTP), User Datagram Protocol (UDP), or any other communication mechanism that enables a client (e.g., the virtual machines) to communicate to a service provider (e.g., the shuffle service). In other implementations, once the mapper component 452 has finished processing the input data records, the virtual machine 462 sends a request to the shuffle service 460 including all of the processed records. Once the shuffle service 460 partitions the processed records, a portion of the partitioned records are provided to the reduce function 454 in the response.

In some implementations, the reducer component 454 may request data records having a particular key or range of keys. For example, the reducer component 454 can subscribe to processed records having a key value of "4." The reducer component 454 can provide the subscription to the shuffle service 460. In implementations where partitions of the processed records are handled by only one reducer, the shuffle service may determine if another reducer has already subscribed to that key range. In some implementations, the shuffle service may assign a key range to a reducer when the reducer component subscribes to the shuffle service. The shuffle service can then push data records to the corresponding reducer components.

Figure 5:
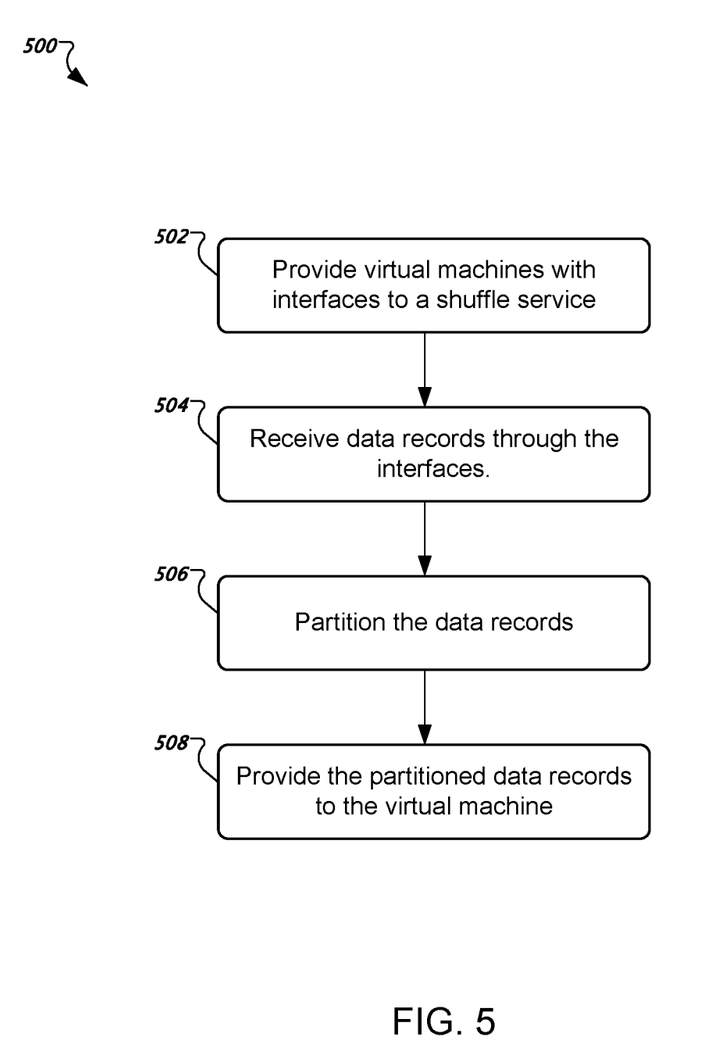
FIG. 5 is a flow chart of a process for providing a shuffle service to virtual machines.

FIG. 5 is a flow chart of a process for providing a shuffle service to virtual machines. For convenience, the process will be described in relation to a computer system performing the process.

An interface to a shuffle service may be provided to virtual machines 502. The shuffle service is executed external to the virtual machines. The interface may be integrated with a virtual operating system or with a host operating system of the host machine of the virtual machine. The interface may be, for example, integrated into the virtual file system of the virtual machine. The interface may be an interface which accepts requests from the virtual machine.

Data records are received through the interface 504. Each data record includes a key which can be used to partition the data records. The data records may be received from the virtual machines over a network. Processing resources (for example, processor time, storage, memory, etc) may be allocated to the partitioning process based in part on the size of the data records. For example, a process to partition one billion three kilobyte records may be allocated more processing resources than a process to partition one thousand two kilobyte records.

The data records are partitioned 506 based on the key. The partitioning may occur on machines that are distinct from the host machines, A part of the partitioned data records are provided, by partition, to the virtual machine 508. For example, a virtual machine may receive all the data records with a particular key, or may receive all the data records with a key within a particular set of keys. The part of the partitioned records may be provided over a network. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus that includes a plurality of computers, the method comprising:

providing, on each computer of a plurality of computers, one or more virtual machines on the computer, and a shuffle interface on the computer to a shuffle service, wherein the shuffle service executes on one or more computers that are independent of the plurality of computers on which the one or more virtual machines are provided, and wherein each virtual machine includes a mapping component of a map reduce framework that applies a mapping function to data records;

for each virtual machine:
  receiving, by the mapping component, a data record having a key and a value;
  generating, by the mapping component, based on the received data record and using a mapping function, an intermediate data record having an intermediate key and an intermediate value, the intermediate key being different from the key;
  sending to the shuffle service, through the shuffle interface executing on the computer on which the virtual machine is executing, the intermediate data record; and
  receiving, from the shuffle service, intermediate data records through the shuffle interface;

wherein:
  the shuffle service partitions groups of intermediate data records according to respective intermediate keys; and
  the intermediate data records received by a particular virtual machine have the same intermediate key and are only provided to the particular virtual machine, and there are a plurality of different intermediate keys and a corresponding plurality of different virtual machines.

2. The method of claim 1, wherein the interface for a virtual machine is integrated with a file system component of the hardware virtualization.

3. The method of claim 2, wherein sending the intermediate data records occurs in response to write operations to the file system.

4. The method of claim 2, wherein receiving the intermediate data records occurs in response to write operations to the file system.

5. The method of claim 2, wherein the file system includes a data storage device shared across host machines.

6. The method of claim 1, wherein the virtual machines send a request to the shuffle service to receive intermediate data records with a particular intermediate key.

7. A system comprising a plurality of computers, and on each computer:

one or more virtual machines are provided on the computer;

a shuffle interface to a shuffle service is provided on the computer, wherein the shuffle service executes on one or more computers that are independent of the plurality of computers on which the one or more virtual machines are provided, and wherein each virtual machine:
  includes a mapping component of a map reduce framework that applies a mapping function to data records;
  receives, by the mapping component, a data record having a key and a value;
  generates, by the mapping component, based on the received data record and using a mapping function, an intermediate data record having an intermediate key and an intermediate value, the intermediate key being different from the key;
  sends to the shuffle service, through the shuffle interface executing on the computer on which the virtual machine is executing, the intermediate data record; and receives, from the shuffle service, intermediate data records through the shuffle interface;

wherein:

the shuffle service partitions groups of intermediate data records according to respective intermediate keys; and the intermediate data records received by a particular virtual machine have the same intermediate key and are only provided to the particular virtual machine, and there are a plurality of different intermediate keys and a corresponding plurality of different virtual machines.

8. The system of claim 7, wherein the interface for a virtual machine is integrated with a file system component of the hardware virtualization.

9. The system of claim 8, wherein sending the intermediate data records occurs in response to write operations to the file system.

10. The system of claim 8, wherein receiving the intermediate data records occurs in response to write operations to the file system.

11. The system of claim 8, wherein the file system includes a data storage device shared across host machines.

12. The system of claim 7, wherein the virtual machines send a request to the shuffle service to receive intermediate data records with a particular intermediate key.

13. A non-transitory computer storage medium encoded with computer program instructions that when executed by one or more computers cause the one or more computers to perform operations comprising:

providing, on each computer of a plurality of computers, one or more virtual machines on the computer, and a shuffle interface on the computer to a shuffle service, wherein the shuffle service executes on one or more computers that are independent of the plurality of computers on which the one or more virtual machines are provided, and wherein each virtual machine includes a mapping component of a map reduce framework that applies a mapping function to data records;

for each virtual machine:

receiving, by the mapping component, a data record having a key and a value;

generating, by the mapping component, based on the received data record and using a mapping function, an intermediate data record having an intermediate key and an intermediate value, the intermediate key being different from the key;

sending to the shuffle service, through the shuffle interface executing on the computer on which the virtual machine is executing, the intermediate data record; and receiving, from the shuffle service, intermediate data records through the shuffle interface;

wherein:

the shuffle service partitions groups of intermediate data records according to respective intermediate keys; and the intermediate data records received by a particular virtual machine have the same intermediate key and are only provided to the particular virtual machine, and there are a plurality of different intermediate keys and a corresponding plurality of different virtual machines.

14. The non-transitory computer storage medium of claim 13, wherein the interface for a virtual machine is integrated with a file system component of the hardware virtualization.

15. The non-transitory computer storage medium of claim 14, wherein sending the intermediate data records occurs in response to write operations to the file system.

16. The non-transitory computer storage medium of claim 14, wherein receiving the intermediate data records occurs in response to write operations to the file system.

17. The non-transitory computer storage medium of claim 14, wherein the file system includes a data storage device shared across host machines.

18. The non-transitory computer storage medium of claim 13, wherein the virtual machines send a request to the shuffle service to receive intermediate data records with a particular intermediate key.

* * * * *